UNITED STATES PATENT OFFICE.

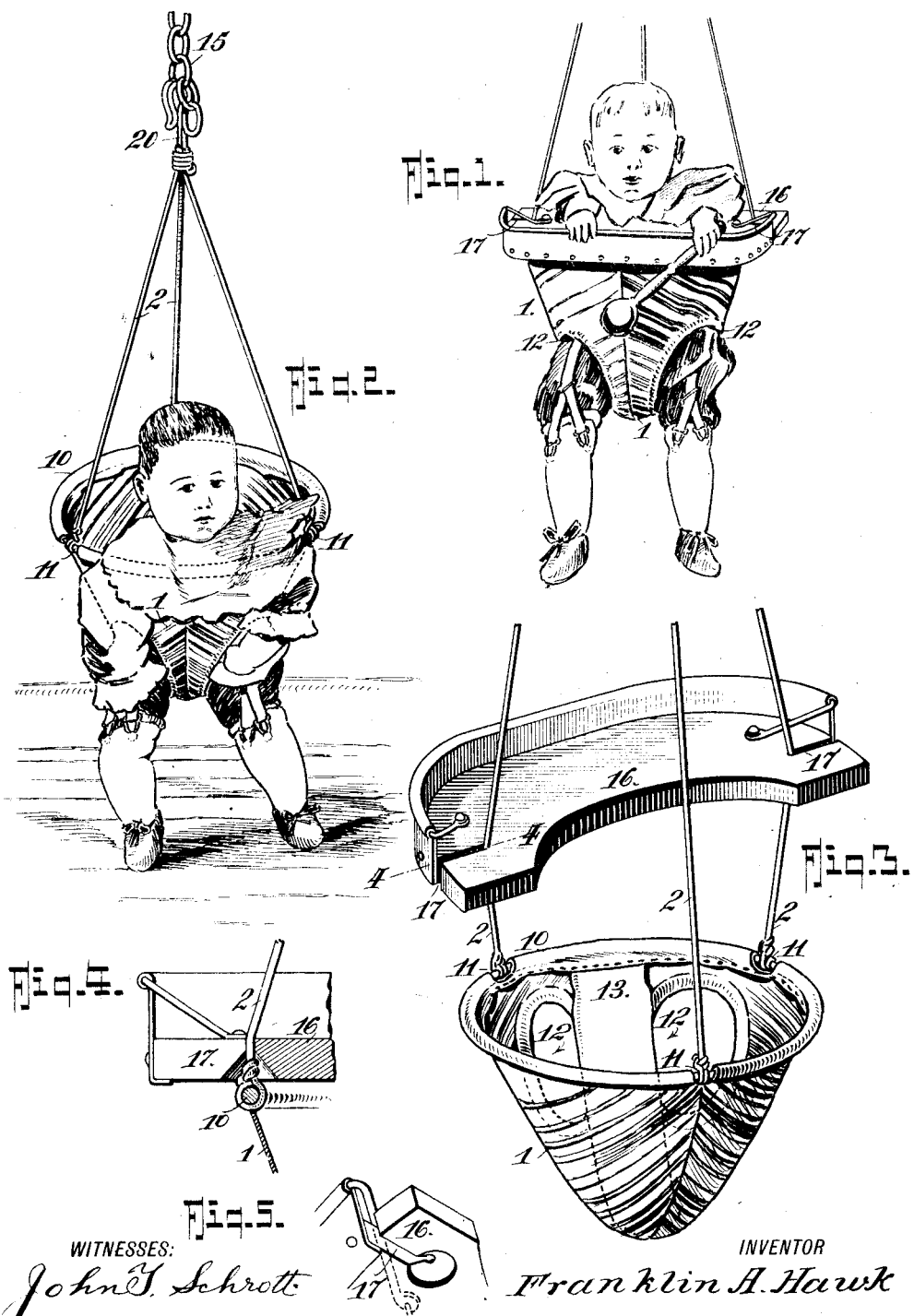

FRANKLIN A. HAWK, OF CENTRAL POINT, OREGON; CLARA M. HAWK EXECUTOR OF SAID FRANKLIN A. HAWK, DECEASED.

COMBINED BABY JUMPER AND SWING.

1,055,975. Specification of Letters Patent. Patented Mar. 11, 1913.

Original application filed February 23, 1912, Serial No. 679,383. Divided and this application filed July 2, 1912. Serial No. 716,782.

*To all whom it may concern:*

Be it known that I, FRANKLIN A. HAWK, residing at Central Point, in the county of Jackson and State of Oregon, have invented a new and Improved Combined Baby Jumper and Swing, of which the following is a specification.

This invention, which relates to appliances for supporting babies as they learn to walk, and which is a divisional part of my invention as disclosed in my copending application filed February 23, 1912, Serial No. 679,383, is more especially designed to serve as a combined baby jumper and swing and also embrace the features of a high chair.

The object of my invention is to provide an appliance of the general character stated of a simple and economical construction, and easily adjusted for producing a baby jumper, walker, a swing and as a high chair.

With other objects in view that will hereinafter appear, my invention consists in the peculiar construction and novel arrangement of parts all of which will be hereinafter fully explained, specifically pointed out in the appended claims and illustrated in the drawing, in which:—

Figure 1 is a perspective view of my invention, the parts being arranged for use as a swinging or high chair support for the baby. Fig. 2 is a similar view, the same being shown as a baby jumper or walker. Fig. 3 is a perspective view of the saddle or seat portion and the removable tray, the latter being shown as elevated above the saddle rim or edge. Fig. 4 is a detail cross section of the tray taken on the line 4—4 on Fig. 3, the said tray being shown as resting on the saddle edge or rim, the latter being also in section, and Fig. 5 is a detail view of a corner of the tray and illustrating the hanger rope passages therein.

In the practical application of my invention the saddle or seat 1 has a bag-like shape, is composed of canvas or other suitable fabric, with the upper edge turned into a hem 10 for receiving a stiffener rod or ring 11 that forms an upper edge for the saddle. The saddle 1 has two leg openings 12—12, whose edges are reinforced as shown and to add strength to the said saddle, a reinforcing crotch band 13 is attached at the ends to the ring hem as is clearly shown in Fig. 3.

The baby saddle or supporting means includes three hanger ropes 2, which have one end fastened to the saddle rim or ring and whose other and upper ends join and are made fast to a spring hook 20 for conveniently suspending the saddle from an overhead support, which may be of any approved construction, a simple hanger chain 15 as shown, but preferably an adjustable supporting means as is fully explained by my copending application.

16 designates a tray having the usual front ledge and its inner end curved to fit closely against the baby. At the opposite ends the said tray has short slots 17 that terminate, at their lower inner ends, in countersunk portions, as is best shown in Figs. 4 and 5 of the drawing.

To obtain the advantages of a high chair, it is only necessary, when the saddle is elevated, to hold the baby above the floor, to adjust the tray in position for use which is readily done by slipping the slotted ends thereof over the opposite stay or hanger members 2—2 in the manner clearly understood from Fig. 3 of the drawing, and then pushing the tray down to the position shown in Fig. 2.

From the foregoing taken in connection with the drawings, the complete arrangement, the manner of its use and the advantages of my invention will be readily apparent.

Having thus described my invention, what I claim is:—

1. In an appliance of the character described, an overhead support, a saddle, hangers for suspending the saddle from the support, a tray removably supported on the saddle, and having portions interlockable with the saddle hangers whereby to sustain the tray upon the saddle.

2. In an appliance of the character stated, an overhead support, a saddle including a rigid upper rim, a plurality of hangers fixedly connected to the saddle rim and pendently supportable from the overhead support, a tray removably mountable upon the rigid upper edge of the saddle, said tray having means for detachably interlocking with some of the saddle hangers whereby to removably secure the tray upon the saddle rim.

3. An appliance of the character described, comprising a saddle for seating the baby, said saddle including a body portion, a plurality of flexible hangers, a rigid rim that forms the upper edge of the saddle body to which the lower ends of the hangers are connected, an overhead support for the hangers, a tray removably mountable over a portion of the saddle body rim, said tray having slots in the opposite ends for receiving some of the said hangers.

4. In an appliance of the character described, the combination with the saddle and the hangers for suspending the saddle, said hangers being knotted to the saddle of a tray having slots to receive a pair of hangers, and having recesses merging with said slots to receive the knotted portions of the hangers whereby said tray will rest on said saddle and be held in position by the gripping effect of said hangers, the distance between the inner ends of the tray slots being at least equal to the distance between the points of connection of the tray engaging hangers with the saddle.

5. In an apparatus of the character described, the combination with the saddle having an annular rigid member, hangers fastened to said member and by which said saddle is suspended, a tray adapted to rest on said rigid member and having opposite slots to receive a pair of hangers, said hangers having enlargements adjacent to said rigid member and said tray having recesses merging with the slots for receiving said enlargements.

FRANKLIN A. HAWK.

Witnesses:
H. W. LINDSAY,
L. HATFIELD.